United States Patent

Mishima

[11] Patent Number: 5,413,538
[45] Date of Patent: May 9, 1995

[54] POWER TRANSMISSION BELT
[75] Inventor: Kyoichi Mishima, Hyogo, Japan
[73] Assignee: Mitsuboshi Belting Ltd., Hyogo, Japan
[21] Appl. No.: 205,993
[22] Filed: Mar. 4, 1994
[30] Foreign Application Priority Data
  Mar. 4, 1993 [JP] Japan .................... 5-070981
[51] Int. Cl.⁶ .............................. F16G 5/08
[52] U.S. Cl. ..................... 474/263; 474/268
[58] Field of Search ................. 474/260–268
[56] References Cited
  U.S. PATENT DOCUMENTS
  4,798,566 1/1989 Sedlacek ............... 474/263 X
  5,120,281 6/1992 Mishima et al. ......... 474/263

Primary Examiner—Michael Powell Buiz
Attorney, Agent, or Firm—Wood, Phillips, VanSanten, Hoffman & Ertel

[57] ABSTRACT

A power transmission belt having a belt body with a length and laterally oppositely facing pulley engaging side surfaces. A first plurality of short fibers, made from a first material, is embedded in the belt body and extends substantially in a lateral direction. A second plurality of short fibers, made from a second material, is embedded in the belt body and extends substantially in a lateral direction. A plurality of the short fibers made from the first material project laterally from at least one of the pulley engaging side surfaces on the belt body.

23 Claims, 3 Drawing Sheets

POWER TRANSMISSION BELT

BACKGROUND OF THE INVENTION

1. Field of the Invention

This invention relates to power transmission belts and, more particularly, to a power transmission belt having fibers protruding from pulley engaging side surfaces thereon.

2. Background Art

When conventional power transmission belts are initially installed on a pulley system, the belts are highly tensioned. The belts are thus pressed tightly against cooperating pulleys. The belt rubber tends to stick to the pulley surfaces which accounts for positive force transmission. However, the high frictional force between the belts and pulleys also accounts for the generation of unwanted noise.

It is known to embed short fibers in the V-shaped portion of a power transmission belt. The fibers are oriented in a lateral direction to enhance lateral pressure resistance on that part of the belt which contacts a cooperating pulley. These fibers are commonly exposed at the laterally oppositely facing pulley engaging side surfaces so as to improve wear resistance at the side surfaces of the belt.

It is also known to embed short fibers in a power transmission belt and to have the fibers protrude from the pulley engaging side surfaces on at least that portion of the belt that frictionally engages a cooperating pulley. Protruding fibers reduce wear on the belt side surfaces and also prevent sticking between the belt side surfaces and a cooperating pulley to alleviate the aforementioned noise generation problem.

It is also known to use short aramid fibers in that portion of the belt that is engaged by a cooperating pulley. Aramid fibers exhibit excellent wear resistance. In Japanese Patent Laid-Open No. 1-164839, aramid fibers are shown protruding from the pulley engaging side surfaces on a power transmission belt to improve the durability thereof.

When a belt with protruding aramid fibers is operated, the cooperating pulleys cause the protruding portions of the aramid fibers to be bent against the side surfaces of the belt. The bent fibers then cover a significant portion of, if not the entire, side portion of the belt which engages the cooperating pulleys in operation. The aramid fibers protect the pulley engaging side surfaces of the belt from wear.

In operation, the pulleys not only bend the exposed portions of the aramid fibers but eventually embed the fibers into the rubber of the side surfaces. This embedding is advantageous in terms of wear resistance in that the fibers remain intact for a long period of time. However, in certain systems, this condition is undesirable.

More particularly, in systems that utilize an automatic tensioner to maintain a predetermined tension on a belt, if the belt does not slip at the time of the initial set-up, it normally will not slip thereafter. That is because the tensioner maintains a relatively constant tension on the belt throughout its life.

However, in a system in which belts are pre-tensioned by relatively moving one or more pulleys, and no tensioner is used, a problem arises. Over the life of the belt, the tension may be reduced as the belt stretches or one or more of the pulleys repositions. The aramid fibers exposed at the pulley engaging side surfaces reduce the friction between the slackened belt and the cooperating pulley so that the belt may slip on the pulley. This reduces the power transmitting capability of the belt.

Accordingly, while the use of laterally extending and protruding aramid fibers has significant advantages, conventional type belts having aramid fibers do have a problem by reason of the embedding of the fibers. Since the power transmission belt is designed to positively transmit power, any slippage of the belt presents a serious problem.

SUMMARY OF THE INVENTION

The present invention is specifically directed to overcoming the above enumerated problems in a novel and simple manner.

In one form of the invention, a power transmission belt is provided having a belt body with a length and laterally oppositely facing pulley engaging side surfaces. A first plurality of short fibers, made from a first material, is embedded in the belt body and extends substantially in a lateral direction. A second plurality of short fibers, made from a second material, is embedded in the belt body and extends substantially in a lateral direction. A plurality of short fibers made from the first material project laterally from at least one of the pulley engaging side surfaces on the belt body.

The inventive structure can be incorporated into all types of power transmission belts, including V-belts, V-ribbed belts, etc.

In one form, the fibers made from the first material have better wear resistance than the fibers made from the second material.

The fibers in the second plurality of fibers may be fibers that are at least one of a) natural fiber that is at least one of cotton and pulp and b) synthetic fiber that is at least one of nylon, vinylon and polyester.

In one form, the fibers in the first plurality of fibers are aramid fibers. The aramid fibers are at least one of polymetaphenylene isophthal amide and polyparaphenylene isophthal amide. Suitable aramid fibers are commercially available and sold under the trademarks KEVLAR, TWARON, CORNEX and NOMEX.

The fibers in the first and second plurality of fibers preferably have a length of 2 to 10 mm.

In one form, the plurality of fibers that project laterally outwardly from the at least one pulley engaging side surface project a distance of 0.1 mm to 3 mm.

The belt body has a rubber portion in which the first and second plurality of fibers are embedded and the first plurality of fibers is present in an mount of 3 to 10 parts by weight per 100 parts by weight of rubber.

The second plurality of fibers are present in an mount of 10 to 20 parts by weight per 100 parts by weight of rubber.

Preferably, a plurality of the short fibers made from the second material are exposed at at least one of the pulley engaging side surfaces on the belt.

In one form, there are no significant number of fibers made from the second material that project from either of the pulley engaging side surfaces as far as the fibers made from the first material project from either of the pulley engaging side surfaces.

The belt body may include a cushion rubber layer in which a plurality of load carrying cords are embedded. The rubber in the cushion layer may be at least one of chloroprene rubber (CR), H-NBR rubber, CSM rubber, natural rubber (NR), SBR rubber, and butadiene rubber (BR).

A sheet of canvas may be applied to the outside surface of the belt body.

The invention contemplates the power transmission belt in combination with a plurality of pulleys about which the power transmission belt is trained and wherein there is no automatic tensioner acting on the power transmission belt. The inventive belt would, however, function well with an automatic tensioner.

In another form of the invention, a power transmission belt is provided having a belt body with a first plurality of short fibers on the belt body made from a first material, and a second plurality of short fibers made from a second material and embedded in the belt body. A plurality of the short fibers made from the first material project laterally outwardly from at least one of the pulley engaging side surfaces on the belt body.

DETAILED DESCRIPTION OF THE DRAWINGS

Figure 1:
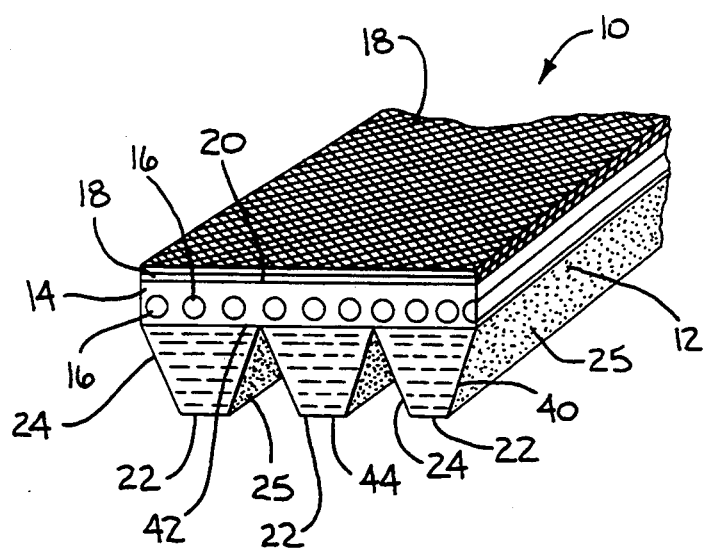
FIG. 1 is a perspective view of a portion of a V-ribbed power transmission belt made according to the present invention.
Figure 7:
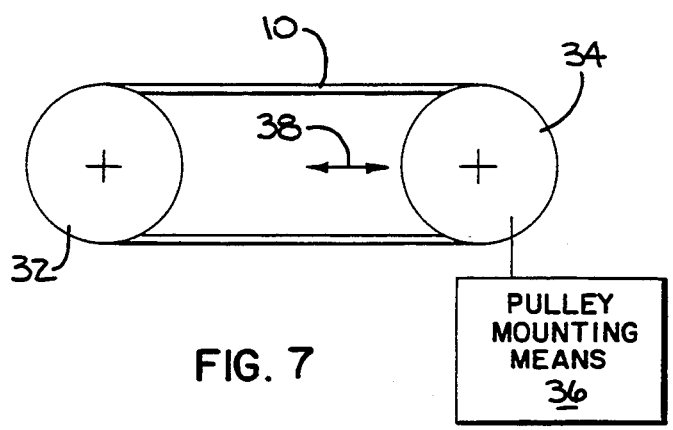
FIG. 7 is a side elevation view of the inventive belt trained around a pair of spaced pulleys.
Figure 2:
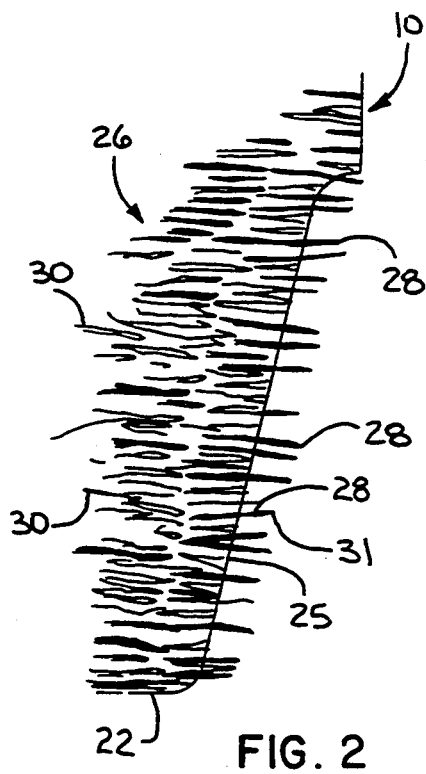
FIG. 2 is an enlarged, fragmentary, cross-sectional view of a portion of a rib on the V-ribbed belt of FIG. 1 prior to operation thereof.
Figure 3:
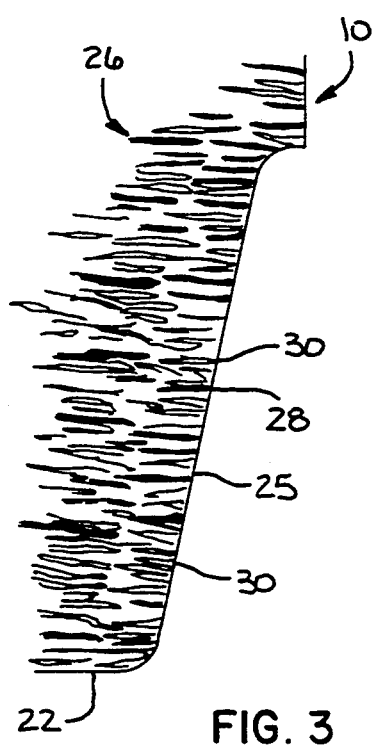
FIG. 3 is a view as in FIG. 2 after continuous running of the belt for 48 hours.

In FIGS. 1-3 and 7, a V-ribbed belt, made according to the present invention, is shown at 10. It should be understood that the inventive concept could be incorporated into other types of belts, such as a V-belt, etc.

The belt has a body 12 including a cushion rubber layer 14 within which longitudinally extending, laterally spaced, load carrying cords 16 are embedded. The cords 16 may be conventionally constructed to have high strength and good resistance to elongation. The rubber in the cushion layer 14 is preferably one of chloroprene rubber (CR), H-NBR rubber, CSM rubber, natural rubber (NR), SBR rubber, or butadiene rubber (BR). At least one canvas sheet 18 is adhered to the outside surface 20 of the cushion rubber layer 14. In this case, two sheets 18 are applied, with the outermost sheet 18 defining the outer surface of the belt 10. A plurality of longitudinally extending, V-shaped ribs 22 are defined on the belt body 12 inside of the cushion rubber layer 14. The ribs 22 are made from the same rubber as used for the cushion rubber layer 14. Each rib 22 has laterally oppositely facing, pulley engaging side surfaces 24, 25, which are designed to frictionally engage complementary pulley surfaces. Through this frictional engagement, the belt 10 drives and is driven by a cooperating pulley.

Within the ribs 22, a plurality of laterally extending reinforcing fibers 26 are embedded. The fibers 26 are made up of a mixture of short, aramid fibers 28, and short, non-aramid fibers 30, which extend substantially laterally of the belt body 12.

The non-aramid fibers 30 do not have the same level of abrasion resistance that the aramid fibers 28 do. The non-aramid fibers 30 may be natural fibers, such as cotton or pulp, or synthetic fibers, such as nylon, vinylon, and polyester, or a mixture thereof.

For the aramid fibers 28, polyparaphenylene isophthal amide may be used as para-type aramid fibers, and polymetaphenylene isophthal amide may be used as meta-type aramid fibers. Commercially produced fibers are currently available. DuPont offers a product under the trademark KEVLAR and Enka offers a product under the trademark TWARON which may be used for the para-type aramid fibers. Teijin offers a product under the trademark CORNEX and DuPont offers a product under the trademark NOMEX, which may be used for the meta-type aramid fibers.

The aramid fibers 28 have portions 31 that protrude from the side surfaces 24, 25 of the belt. The fibers 28 bend over in use and cover a substantial portion of the side surfaces 24, 25 of the belt 10 to reduce friction between the belt side surfaces 24, 25 and a cooperating pulley and minimize noise generation with the belt 10 in use. The fibers 28 protrude preferably a length between 0.1 and 3.0 mm.

If the length of the protruding portions 31 of the aramid fibers 28 is less than 0.1 mm, too little of the belt side surfaces 24, 25 is covered by the bent fibers 28 to achieve optimum results. If the length of the protruding fibers 28 is more than 3 mm, the ribs 22 may not seat properly in grooves on a cooperating pulley. Further, the friction between the belt 10 and pulleys 32, 34 may be detrimentally reduced when the belt is first installed.

The embedded, non-aramid fibers 30 are cut closer to the side surfaces 24, 25, to be exposed thereat with a projection that is less than the projection of the aramid fibers 28. It is intended that there be little or no projection of the non-aramid fibers 30. However, there normally results some projection that might be characterized as "stubble".

The length of the aramid fibers 28 and non-aramid fibers 30 is preferably in the range of 2-10 mm. If the length of the aramid and non-aramid fibers 28, 30 is less than 2 mm, the fibers 28, 30 contribute little in terms of lateral reinforcement. Further, the fibers 28, 30 may pull out of the belt body 12 in operation as when the side surfaces 24, 25 contact a cooperating pulley. If the length of the fibers 28, 30 is greater than 10 mm, the fibers 28, 30 may become entangled in the belt body 12 and not properly assume a lateral orientation, which thereby affects their ability to laterally reinforce the belt. Excessive length of the fibers 28, 30 may also adversely affect the bending properties of the belt.

The aramid fibers 28 are mixed in the rubber portion in which they are embedded in an amount of 3 to 10 parts by weight of fiber 28 to 100 parts by weight of rubber. The non-aramid fibers 30 are mixed in an mount of 10 to 20 parts by weight of fiber 30 per 100 parts of rubber. It is not necessary that the weight percentage of aramid and non-aramid fibers 28, 30 be the same, nor is it necessary for the weight percentage of the total amount of fiber 28, 30 to be the same.

If the non-aramid fibers 30 are included in an amount that is less than 10 parts by weight per 100 weight parts of rubber, the projecting portions 31 of the aramid fibers 30 are allowed to embed in the rubber between the fibers 30 as they are pressed thereagainst by a cooperating pulley. On the other hand, inclusion of the non-aramid fibers 30 in an amount more than 20 parts by weight per 100 parts by weight of rubber makes it difficult to provide a uniformly dispersed rubber. The non-aramid fibers 30 become too dense and deteriorate the bending properties of the ribs 22, which may reduce the life of the belt.

Inclusion of the aramid fibers 28 in an mount less than 3 parts by weight per 100 parts by weight of rubber causes an insufficient amount of the aramid fiber 28 to be exposed at the belt side surfaces 24, 25 for optimum performance. On the other hand, inclusion of the aramid fibers 28 in an amount greater than 10 parts by weight per 100 parts by weight of rubber increases the total weight percentage of aramid and non-aramid fibers 28, 30 to in excess of 20 parts, which again adversely affects the bending properties of the belt.

The belt 10 is intended to be trained around at least two cooperating pulleys 32, 34, which have grooves that are complementary to the ribs 22. The pulley 34 is supported on a pulley mounting means 36 which allows the pulley 34 to be moved towards and away from the pulley 32 in the line of the double-headed arrow 38. The pulley 34 can be moved towards the pulley 32 to allow the belt 10 to be trained around the pulleys 32, 34, after which the pulley 34 is moved away from the pulley 32 to place the desired tension on the belt 10.

With the belt 10 in place, the projecting aramid fibers 28 reside between the belt surfaces 24, 25 and the cooperating surfaces on the pulleys 32, 34. This provides a protective layer between the belt 10 and pulley which limits wear on the belt side surfaces 24, 25. At the same time, the protruding fibers 28 prevent sticking between the belt 10 and pulleys 32, 34, which could generate unwanted noise as the system is operated.

As the belt 10 is operated on the pulleys 32, 34, the protruding fibers 28 are pressed against the pulley surfaces 24, 25. The aramid fibers 28 are prevented from embedding in the rubber defining the ribs 22 by the exposed ends of the fibers 30. As the belt 10 continues to operate, the majority of the aramid fibers 28 are pinched between the pulleys 32, 34 and the exposed ends of the fibers 30 and severed.

After use, the tension on the belt 10 reduces and stabilizes. The tension may reduce to one-half of that which it was when the system was initially set up. At that stage, the protruding portions of the aramid fibers 28 have been severed so that the rubber within which the fibers 28 are embedded is substantially fully exposed. The aramid fibers 28 and non-aramid fibers 30 are then exposed as "stubble", which has little effect in terms of the friction characteristics of the side surfaces 24, 25 of the belt 10. While the tension of the belt 10 is reduced, the friction between the belt 10 and pulleys 32, 34 is increased by reason of the severance of the protruding portions 31 of the fibers 30 so that positive force transmission can be effected with the belt 10, even with the tension thereof reduced and stabilized.

A preferred manner of making the inventive belt will now be described. The belt 10 is formed by placing one or more canvas layers 18 on the outside surface 20 of the cushion rubber layer 14 having the cords 16 embedded therein. The fibers 28, 30 are then embedded in a predetermined mount in a rubber layer 40 in a laterally extending direction. The layer 40, from which the ribs 22 are formed, is placed on the inside surface 42 of the cushion rubber layer 14. The ribs 22 are defined in the layer 40 by pressing a rotating V-shaped, annular, polishing machine against the inside surface 44 of the layer 40 to progressively form the ribs 22.

The aramid fibers 28 have excellent wear resistance and an excellent greige tensile modulus and thus are not cleanly severed by the polishing machine. As a result, they protrude from the belt side surfaces 24, 25 a desired mount. On the other hand, the non-aramid fibers 30, which do not have the wear resistance that the aramid fibers 28 do, are cut to be exposed at the side surfaces 24, 25 but close to flush therewith so as to exist as stubble at the side surfaces 24, 25.

Testing

The advantages of the present invention are evident from the following comparative testing.

The Inventive Test Belt

The test belt 10 was a V-ribbed belt containing 5 parts by weight of aramid fiber 28 and 13 parts by weight of nylon fiber 30 per 100 parts by weight of rubber in which the fibers 28, 30 were embedded. The belt 10 had three fibs and a length of 1100 mm.

Comparative Belt

A V-ribbed belt was used having a similar construction to that disclosed in Japanese Patent Laid-Open No. 1-164839. The belt contained 6 parts by weight of aramid fiber per 100 parts by weight of rubber. The fibers had a 4 mm circumference. The belt had the same general shape as the inventive belt.

Test Set Up

Figure 4:
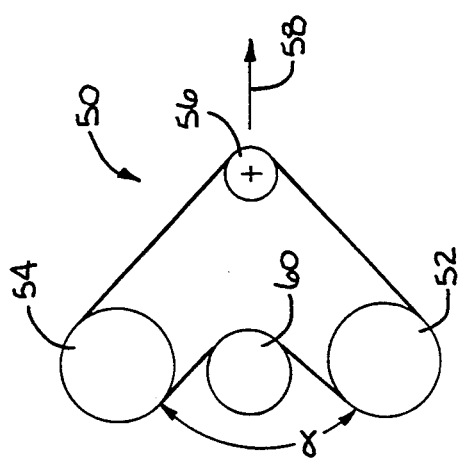
FIG. 4 is a schematic representation of a set-up for testing power transmission capabilities for a V-ribbed belt.

The belts were both mounted on a test set up as shown at 50 in FIG. 4. The test set up has a drive pulley 52 with a diameter of 120 mm. The drive pulley 52 was rotated at approximately 2000 rpm. A driven pulley 54 has a diameter of 120 mm. An automatic tensioner 56, with a diameter of 45 mm, was subjected to a load in the direction of arrow 58 of 21 kgf. An idler pulley 60 was pressed against the belts so that the belt wrap angle $\alpha$ was 120°. The system was operated in an environment at 120° C.

Figure 5:
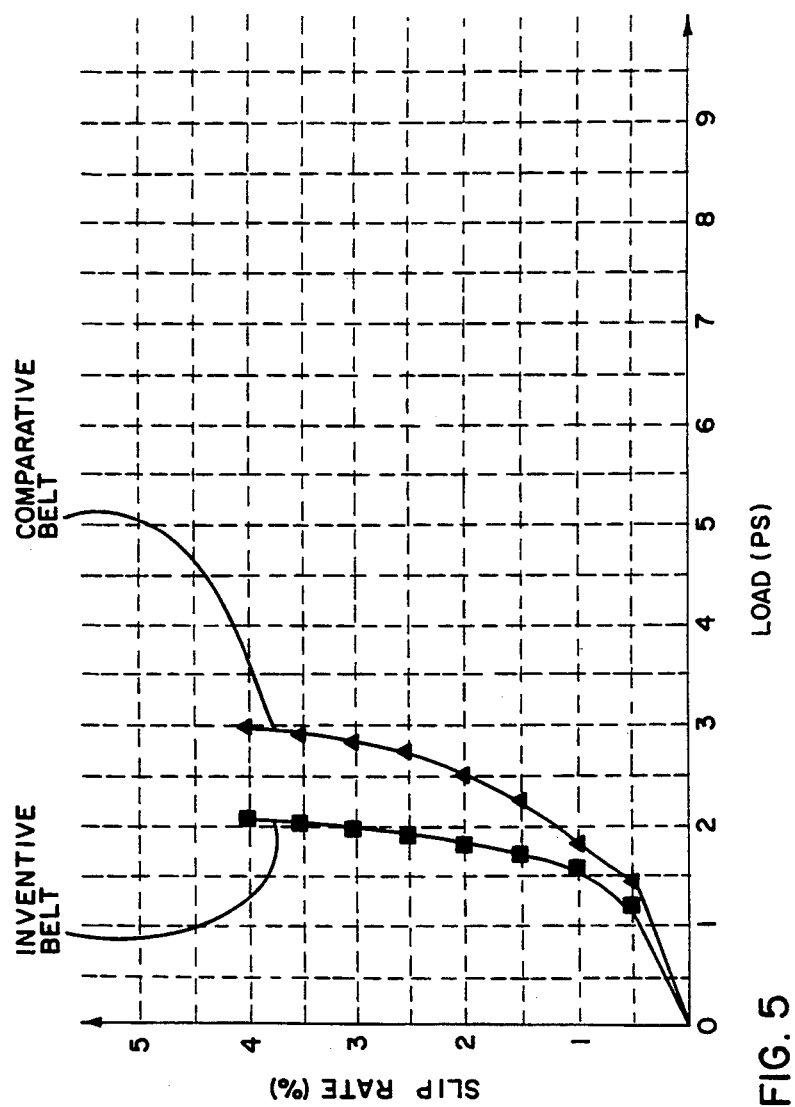
FIG. 5 is a graph showing slip rate under different loading for the inventive belt and a comparative belt.
Figure 6:
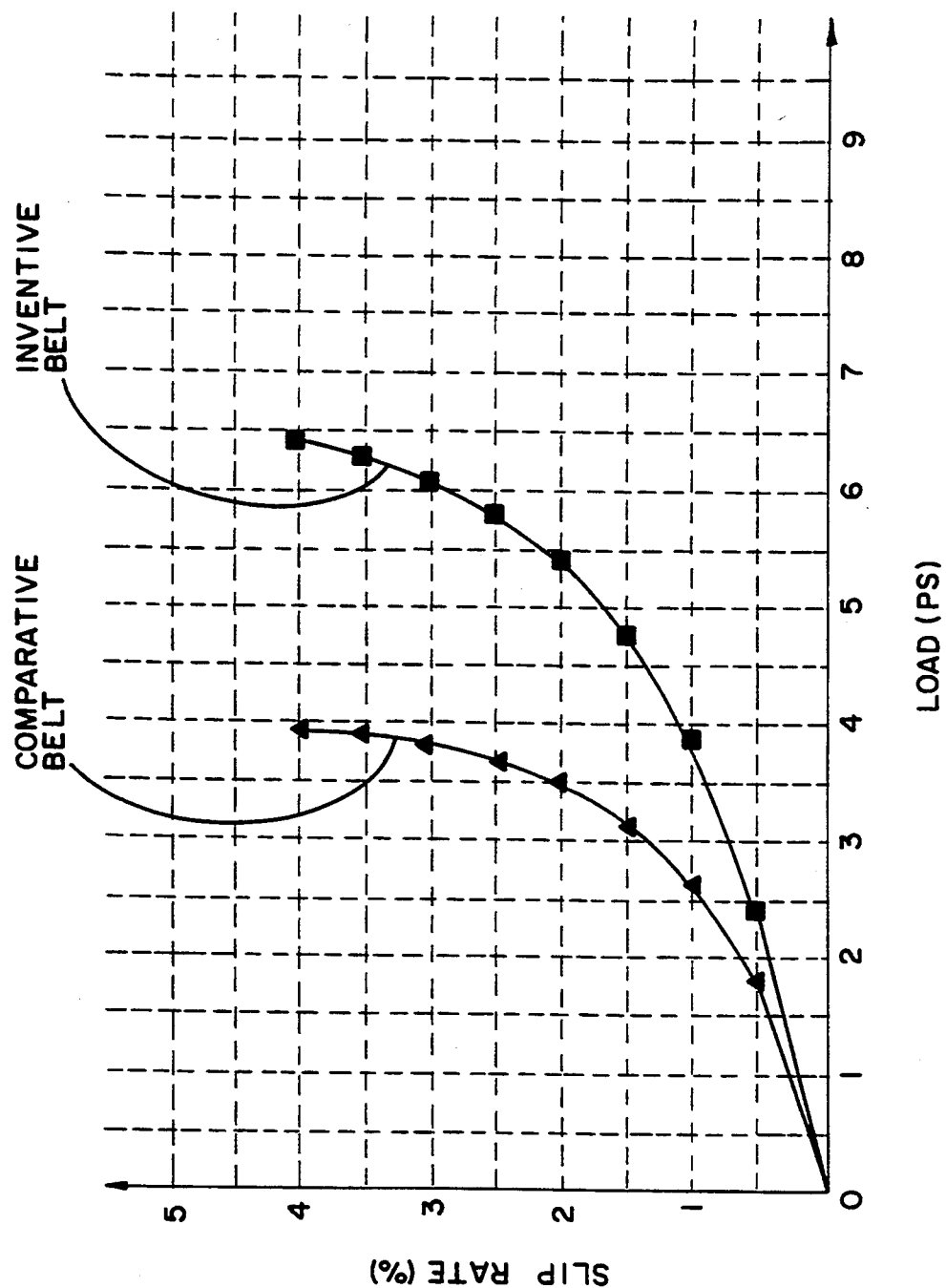
FIG. 6 is a graph as in FIG. 5 for the same two belts after both were run continuously for 48 hours.

FIG. 5 shows the slip rate for the inventive and comparative belts at different loading immediately after the belts were set up. FIG. 6 is a graph similar to that in FIG. 5, with the same belts, with the data generated 48 hours after continuous running of both belts.

From the test results, it can be seen that the slip rate for the inventive belt is slightly larger than that of the comparative belt at start up. After the belts were both run continuously for 48 hours, the slip rate for the inventive belt was significantly less than that for the comparative belt under the same load. In other words, the slip rate for the comparative belt having only aramid fibers increased so that the power transmission capability for the comparative belt was reduced after the belt was run for a relatively short period of time, i.e. after the tension of the belt was reduced and stabilized. This is attributable to the fact that the aramid fibers remained embedded in the belt body and fully exposed through a substantial portion of the belt life.

On the other hand, with the inventive belt, the aramid fibers 28 did not embed in the belt side surfaces 24, 25, due to the presence of the non-aramid fibers 30 exposed at the surfaces 24, 25. As a result, the protruding portions of the aramid fibers 28 were severed so that principally only the cut ends of the aramid and non-aramid fibers 28, 30 were exposed at the side surfaces 24, 25 after only 48 hours of continuous running. The amount of slip is reduced by reason of the more significant exposure of the rubber on the side surfaces 24, 25, which accounted for a greater power transmission capability.

The foregoing disclosure of specific embodiments is intended to be illustrative of the broad concepts comprehended by the invention.

I claim:

1. A power transmission belt comprising:
   a belt body having a length and laterally oppositely facing pulley engaging side surfaces;
   a first plurality of short fibers embedded in the belt body and extending substantially in a lateral direction,
   said first plurality of short fibers being made from a first material; and
   a second plurality of short fibers embedded in the belt body and extending substantially in a lateral direction,
   said second plurality of short fibers being made from a second material,
   there being a plurality of said short fibers made from said first material that project laterally outwardly from at least one of the pulley engaging side surfaces on the belt body.

2. The power transmission belt according to claim 1 wherein the power transmission belt is one of a V-belt and a V-ribbed belt.

3. The power transmission belt according to claim 1 wherein the fibers made from the first material have better wear resistance than the fibers made from the second material.

4. The power transmission belt according to claim 1 wherein the fibers in the second plurality of fibers are fibers that are at least one of a) natural fiber that is at least one of cotton and pulp and b) synthetic fiber that is at least one of nylon, vinylon, and polyester.

5. The power transmission belt according to claim 1 wherein the fibers in the first plurality of fibers are aramid fiber.

6. The power transmission belt according to claim 5 wherein the aramid fibers are at least one of polymetaphenylene isophthal amide and polyparaphenylene isophthal amide.

7. The power transmission belt according to claim 5 wherein the aramid fibers are fibers sold commercially under at least one of the trademarks KEVLAR, TWARON, CORNEX, and NOMEX.

8. The power transmission belt according to claim 1 wherein the fibers in the first and second plurality of fibers have a length of 2 to 10 mm.

9. The power transmission belt according to claim 1 wherein the plurality of fibers that project laterally outwardly from the at least one pulley engaging side surface project a distance of 0.1 mm to 3 mm.

10. The power transmission belt according to claim 1 wherein the belt body has a rubber portion in which the first and second plurality of fibers are embedded and the first plurality of fibers in the rubber portion is present in an mount of 3 to 10 parts by weight per 100 parts by weight of rubber.

11. The power transmission belt according to claim 1 wherein the belt body has a rubber portion in which the first and second plurality of fibers is embedded and the second plurality of fibers in the rubber portion is present in an amount of 10 to 20 parts by weight per 100 parts by weight of rubber.

12. The power transmission belt according to claim 1 wherein the belt body includes a cushion rubber layer in which a plurality of load carrying cords are embedded, and the rubber in the rubber cushion layer is at least one of chloroprene rubber (CR), H-NBR rubber, CSM rubber, natural rubber (NR), SBR rubber, and butadiene rubber (BR).

13. The power transmission belt according to claim 1 wherein the belt body has an inside surface and an outside surface and at least one of the inside and outside surfaces is defined by a sheet of canvas.

14. The power transmission belt according to claim 1 wherein there are no significant number of fibers made from the second material that project from either of the pulley engaging side surfaces as far as the fibers made from the first material project from the at least one of the pulley engaging side surfaces.

15. The power transmission belt according to claim 1 wherein a plurality of said short fibers made from said second material are exposed at at least one of the pulley engaging side surfaces on the belt body.

16. The power transmission belt according to claim 1 in combination with a plurality of pulleys about which the power transmission belt is trained and there is no automatic tensioner acting on the power transmission belt.

17. A power transmission belt comprising:
    a belt body having a length and laterally oppositely facing pulley engaging side surfaces;
    a first plurality of short fibers embedded in the belt body,
    said first plurality of short fibers being made from a first material; and
    a second plurality of short fibers embedded in the belt body,
    said second plurality of short fibers being made from a second material,
    there being a plurality of said short fibers made from said first material that project laterally outwardly from at least one of the pulley engaging side surfaces on the belt body.

18. The power transmission belt according to claim 17 wherein the fibers in the second plurality of fibers are fibers that are at least one of a) natural fiber that is at least one of cotton and pulp and b) synthetic fiber that is at least one of nylon, vinylon, and polyester.

19. The power transmission belt according to claim 17 wherein the fibers in the first plurality of fibers are aramid fiber.

20. The power transmission belt according to claim 17 wherein the fibers in the first and second plurality of fibers have a length of 2 to 10 mm.

21. The power transmission belt according to claim 17 wherein the plurality of fibers that project laterally outwardly from the at least one pulley engaging side surface project a distance of 0.1 mm to 3 mm.

22. The power transmission belt according to claim 17 wherein the belt body has a rubber portion in which the second plurality of fibers is embedded and the second plurality of fibers in the rubber portion is present in an mount of 10 to 20 parts by weight per 100 parts by weight of rubber.

23. The power transmission belt according to claim 17 in combination with a plurality of pulleys about which the power transmission belt is trained and wherein there is no automatic tensioner acting on the power transmission belt.

* * * * *